US012561948B2

(12) United States Patent
Shin et al.

(10) Patent No.: US 12,561,948 B2
(45) Date of Patent: Feb. 24, 2026

(54) LOGO DETECTION MODULE, TIMING CONTROLLER INCLUDING THE SAME, AND DRIVING METHOD OF THE SAME

(71) Applicant: LX SEMICON CO., LTD., Daejeon (KR)

(72) Inventors: Hyeon Woon Shin, Daejeon (KR); Moon Cheol Kim, Daejeon (KR); Seong Beom Park, Daejeon (KR); Sung Woo Han, Daejeon (KR)

(73) Assignee: LX SEMICON CO., LTD, Daejon (KR)

( * ) Notice: Subject to any disclaimer, the term of this patent is extended or adjusted under 35 U.S.C. 154(b) by 188 days.

(21) Appl. No.: 18/211,733

(22) Filed: Jun. 20, 2023

(65) Prior Publication Data

US 2024/0013512 A1 Jan. 11, 2024

(30) Foreign Application Priority Data

Jul. 6, 2022 (KR) ........................ 10-2022-0082837

(51) Int. Cl.
G06V 10/74 (2022.01)
G06V 10/25 (2022.01)
(Continued)

(52) U.S. Cl.
CPC ............ G06V 10/761 (2022.01); G06V 10/25 (2022.01); G06V 10/60 (2022.01); G06V 10/751 (2022.01); G06V 2201/09 (2022.01)

(58) Field of Classification Search
CPC ...... G06V 10/761; G06V 10/25; G06V 10/60; G06V 10/751; G06V 2201/09;
(Continued)

(56) References Cited

U.S. PATENT DOCUMENTS

2005/0078222 A1 4/2005 Liu et al.
2005/0078223 A1* 4/2005 Liu ........................ G06V 20/62
375/E7.182
(Continued)

FOREIGN PATENT DOCUMENTS

KR 10-2001-0108964 A 12/2001
KR 10-2004-0029759 A 4/2004
(Continued)

OTHER PUBLICATIONS

Kim et al.; "Effective burn-in reduction of organic light-emitting diode display using perceptual color difference between logo and background"; Published: Dec. 14, 2022 (Year: 2022).*

*Primary Examiner* — Aaron W Carter
(74) *Attorney, Agent, or Firm* — Greenberg Traurig, LLP

(57) ABSTRACT

A logo detection module includes a preprocessing unit extracts partial image data corresponding to a predetermined logo detection window region from image data, and acquire gray values based on RGB pixel values of a plurality of pixels included in the extracted partial image data, a logo template generation unit calculates a cumulative gray average value for each pixel based on the gray values of the plurality of pixels acquired using first partial image data, determine a logo pixel based on the calculated cumulative gray average value for each pixel, and generate a logo map including the logo pixel, and a logo compensation unit matches the plurality of pixels included in second partial image data extracted from second image data input after the logo map is generated and the logo pixels included in the logo map to calculate a matching rate, and determine logo compensation based on the calculated matching rate.

25 Claims, 9 Drawing Sheets

(51) Int. Cl.
  *G06V 10/60*   (2022.01)
  *G06V 10/75*   (2022.01)
(58) Field of Classification Search
  CPC ............ G06V 10/56; G09G 5/36; G09G 3/20;
     G09G 3/3208; G09G 3/3225; G09G 3/36;
        G09G 3/3648; G09G 5/10; G09G
       2320/0257; G09G 2320/043; G09G
          2310/08; G09G 2340/16
  See application file for complete search history.

(56)     References Cited

U.S. PATENT DOCUMENTS

| | | | |
|---|---|---|---|
| 2009/0324088 A1* | 12/2009 | Chamaret | G06V 10/255 |
| | | | 382/195 |
| 2012/0177249 A1 | 7/2012 | Levy et al. | |
| 2013/0223692 A1 | 8/2013 | Liu et al. | |
| 2014/0003677 A1* | 1/2014 | Han | G06V 40/13 |
| | | | 382/124 |
| 2014/0079321 A1 | 3/2014 | Huynh-Thu et al. | |
| 2014/0146071 A1* | 5/2014 | Kim | G09G 3/3225 |
| | | | 345/589 |
| 2015/0062197 A1* | 3/2015 | Jung | G09G 3/2003 |
| | | | 345/690 |
| 2015/0125029 A1 | 5/2015 | Li | |
| 2016/0140895 A1* | 5/2016 | Park | G09G 3/3208 |
| | | | 345/690 |
| 2016/0295287 A1* | 10/2016 | Jiang | H04N 21/41407 |
| 2016/0351115 A1* | 12/2016 | Bang | G09G 3/3208 |
| 2017/0039409 A1* | 2/2017 | Han | G06F 3/0421 |
| 2017/0061852 A1* | 3/2017 | Byun | G09G 3/2055 |
| 2017/0169056 A1* | 6/2017 | Brailovsky | G06V 10/443 |
| 2018/0018522 A1 | 1/2018 | Litvak et al. | |
| 2020/0074596 A1* | 3/2020 | Chun | G09G 3/20 |
| 2020/0074708 A1* | 3/2020 | Park | G06T 11/60 |
| 2020/0082796 A1* | 3/2020 | Chun | G09G 5/38 |
| 2021/0103765 A1* | 4/2021 | Chun | G09G 5/36 |
| 2021/0174716 A1* | 6/2021 | Noh | G09G 3/035 |
| 2021/0201041 A1* | 7/2021 | Rao | G06V 10/56 |
| 2021/0375189 A1* | 12/2021 | Chun | G09G 3/2092 |
| 2021/0398493 A1* | 12/2021 | Chun | G09G 3/2007 |
| 2022/0028355 A1* | 1/2022 | Chun | G09G 5/10 |
| 2022/0076635 A1* | 3/2022 | Jang | G09G 5/363 |
| 2022/0122544 A1* | 4/2022 | Chun | G09G 3/3233 |
| 2022/0164061 A1* | 5/2022 | Lim | G06F 3/0412 |
| 2022/0198997 A1* | 6/2022 | Kim | G06F 18/22 |
| 2023/0069014 A1* | 3/2023 | Liu | H04N 23/667 |
| 2023/0162651 A1* | 5/2023 | Park | G09G 3/20 |
| | | | 345/55 |
| 2024/0013512 A1* | 1/2024 | Shin | G06V 10/761 |

FOREIGN PATENT DOCUMENTS

| | | |
|---|---|---|
| KR | 10-2005-0034538 A | 4/2005 |
| KR | 10-0594806 B1 | 6/2006 |
| KR | 10-2014-0070792 A | 6/2014 |
| KR | 10-2015-0057026 A | 5/2015 |
| KR | 10-2017-0081032 A | 7/2017 |

\* cited by examiner

|   | 0 | 1 | 2 | 3 | 4 | 5 | 6 | 7 | 8 | 9 |
|---|---|---|---|---|---|---|---|---|---|---|
| 0 | 0 | 0 | 0 | 1 | 1 | 1 | 1 | 0 | 0 | 0 |
| 1 | 0 | 0 | 0 | 0 | 0 | 0 | 1 | 0 | 0 | 0 |
| 2 | 0 | 0 | 0 | 0 | 0 | 0 | 1 | 0 | 0 | 0 |
| 3 | 0 | 0 | 0 | 0 | 0 | 0 | 1 | 0 | 0 | 0 |
| 4 | 0 | 0 | 0 | 1 | 1 | 1 | 1 | 0 | 0 | 0 |
| 5 | 0 | 0 | 0 | 0 | 0 | 0 | 1 | 0 | 0 | 0 |
| 6 | 0 | 0 | 0 | 0 | 0 | 0 | 1 | 0 | 0 | 0 |
| 7 | 0 | 0 | 0 | 1 | 1 | 1 | 1 | 0 | 0 | 0 |

LP    NLP

LOGO DETECTION MODULE, TIMING CONTROLLER INCLUDING THE SAME, AND DRIVING METHOD OF THE SAME

FIELD

The disclosure relates to a logo detection module capable of reducing deterioration due to a logo, a timing controller including the same, and a driving method of the same.

BACKGROUND

As an information society develops, demand for display devices for displaying images is increasing in various forms, and recently, various display devices such as an organic light emitting diode display (OLED) device, a liquid crystal display (LCD) device, and the like have been used.

Among the display devices, the organic light emitting diode display device is a self-emission type display device, and has advantages in that a viewing angle, a contrast ratio, and the like are excellent, a separate backlight is unnecessary and thus a weight can be reduced and a thickness can be thin, and power consumption is low compared to the liquid crystal display (LCD) device. Further, the organic light emitting diode display device has advantages of being driven at a low direct current (DC) voltage, a quick response time, and specifically, low manufacturing costs.

However, the organic light emitting display device has a disadvantage of being easily deteriorated due to a characteristic of an organic light emitting element. Specifically, in the organic light emitting element, when the same high luminance data continues, deterioration is accelerated, and thus an afterimage can remain.

SUMMARY

The disclosure is directed to providing a logo detection module capable of reducing deterioration due to a logo, a timing controller including the same, and a driving method of the same.

Further, the disclosure is directed to providing a logo detection module also capable of stably detecting a translucent logo, a timing controller including the same, and a driving method of the same.

A logo detection module according to an embodiment of the disclosure includes a preprocessing unit configured to extract partial image data corresponding to a predetermined logo detection window region from image data, and acquire gray values based on RGB pixel values of a plurality of pixels included in the extracted partial image data, a logo template generation unit configured to calculate a cumulative gray average value for each pixel based on gray values of a plurality of pixels acquired using first partial image data extracted from first image data input for a first set time or more, determine a logo pixel based on the calculated cumulative gray average value for each pixel, and generate a logo map including the logo pixel, and a logo compensation unit configured to match a plurality of pixels included in second partial image data extracted from second image data input after the logo map is generated and the logo pixels included in the logo map to calculate a matching rate, and determine logo compensation based on the calculated matching rate.

A timing controller according to another embodiment of the disclosure includes a logo detection module configured to calculate a cumulative gray average value for each of a plurality of pixels included in a logo detection window region based on first image data input for a first set time, generate a logo map based on the calculated cumulative gray average value, and compare second image data input after the logo map is generated and the logo map to determine whether to detect a logo and generate a compensation signal, and a data processing unit configured to change luminance of pixels included in a region where a logo is detected in the second image data according to the compensation signal.

A driving method of a logo detection module according to still another embodiment of the disclosure, includes calculating a cumulative gray average value for each of a plurality of pixels based on first image data input for a first set time, determining pixels whose calculated cumulative gray average values exceed a first threshold value among the plurality of pixels as logo target pixels, removing a pixel whose gray change value exceeds a second threshold value from the logo target pixels when the number of logo target pixels is greater than or equal to a predetermined value, and determining the logo target pixels as logo pixels and generating a logo map that indicates the determined logo pixels when there is no change in the number of logo target pixels for a second set time.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 4 is a block diagram illustrating a configuration of a logo template generation unit in FIG. 2;

FIG. 5 is a view illustrating an example of a logo map;

DETAILED DESCRIPTION OF THE DISCLOSURE

Figure 1:
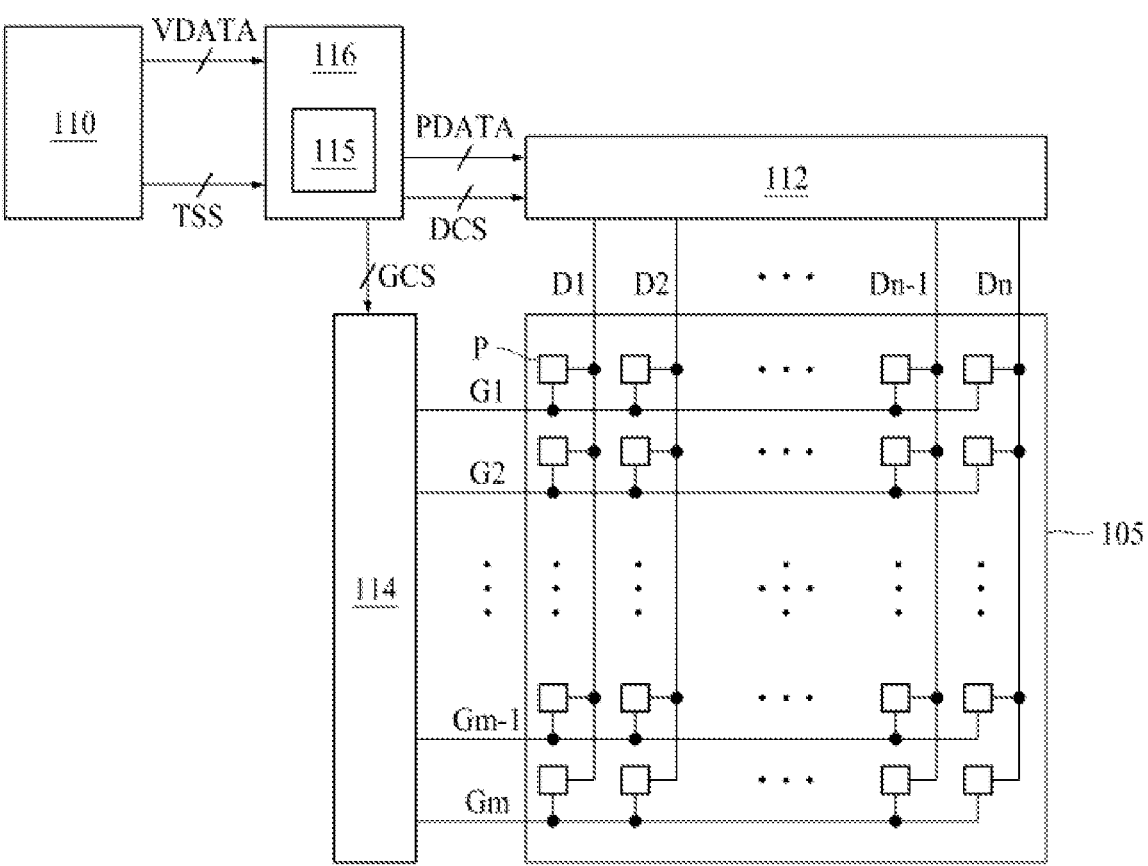
FIG. 1 is a block diagram illustrating a display device according to one embodiment of the disclosure.

The same reference numerals refer to substantially the same components throughout the specification. In the following description, a case not related to the core components of the disclosure and a detailed description for the components and functions known in the technical field may be omitted. Meanings of the terms described herein should be understood as follows.

Advantages and features of the disclosure, and a method of achieving them, will be apparent with reference to embodiments which are described in detail in conjunction with the accompanying drawings. However, the disclosure is not limited to the embodiments which will be described below and may be implemented in different forms. The embodiments are only provided to completely disclose the disclosure and completely convey the scope of the disclosure to those skilled in the art, and the disclosure is only defined by the disclosed claims.

The same reference numerals refer to the same components throughout the specification. Further, in the description of the disclosure, when it is determined that a detailed description of a related known technology may unnecessarily obscure the principle of the disclosure, the detailed description thereof will be omitted.

When terms 'including', 'having', 'formed of', and the like mentioned in the specification are used, other component may be added unless 'only' is used. A case in which a component is expressed in a singular form includes a case of including a plural form unless specifically stated otherwise.

A case of a description of a temporal relationship, for example, a case in which a temporal relationship is described as 'then', 'after', 'next', 'before', or the like may include cases which are not continuous unless 'immediately' or 'directly' is used.

The terms 'first', 'second,' and the like are used to describe various components, but these components are not limited by these terms. These terms are only used to distinguish one component from another. Accordingly, a first component mentioned below may be a second component within the technical spirit of the disclosure.

It should be understood that the term "at least one" includes all combinations which may be proposed from one or more related items. For example, the meaning of "at least one of a first item, a second item, and a third item" may refer to not only each of the first item, the second item, and the third item but also a combination of all items which may be proposed from two or more among the first item, the second item, and the third item.

Characteristics of the various embodiments of the disclosure may be partially or entirely combined with each other, technically linked and driven in various ways, and the embodiments may be implemented independently of each other or implemented together in an associative relationship.

Hereinafter, embodiments of the specification will be described in detail with reference to the accompanying drawings.

FIG. 1 is a block diagram illustrating a display device according to one embodiment of the disclosure.

A display device 100 according to one embodiment of the disclosure performs a display function, and may be implemented as a flat panel display device such as a liquid crystal display (LCD) device or an organic light emitting diode display (OLED) device.

As shown in FIG. 1, the display device 100 according to the disclosure includes a host system 110, a display panel 105, and a display driving apparatus for driving the display panel 105.

The display panel 105 includes a display region where a plurality of pixels P are provided to display an image. The display panel 105 includes a plurality of data lines D1 to Dn (n is a positive integer greater than or equal to 2), a plurality of gate lines G1 to Gm (m is a positive integer greater than or equal to 2), and the plurality of pixels P.

Each of the plurality of data lines D1 to Dn receives a data signal. Each of the plurality of gate lines G1 to Gm receives a gate signal. The plurality of data lines D1 to Dn and the plurality of gate lines G1 to Gm are provided to respectively intersect each other on a substrate to define the plurality of pixels P. Each of the plurality of pixels P may be connected to any one of the plurality of data lines D1 to Dn and any one of the plurality of gate lines G1 to Gm. Each of the plurality of pixels P may include a driving transistor, a scan transistor that is turned on by the gate signal of the gate line to supply a data voltage of the data line to a gate electrode of the driving transistor, an organic light emitting diode which emits light according to a drain-source current of the driving transistor, and a capacitor for storing the voltage of the gate electrode of the driving transistor. Accordingly, each of the plurality of pixels P may emit light according to a current supplied to the organic light emitting diode.

The display driving apparatus causes data signals to be supplied to the plurality of pixels P included in the display panel 105 to display an image through the display panel 105. To this end, the display driving apparatus may include a data driver 112, a gate driver 114, and a timing controller 116.

The data driver 112 receives pixel data PDATA and a data control signal DCS from the timing controller 116.

In one embodiment, the data driver 112 may receive a clock embedded data signaling (CEDS) packet from the timing controller 116 and acquire a clock signal, the data control signal DCS, and the pixel data PDATA from the CEDS packet. Here, the CEDS packet may refer to a packet in which a clock is embedded between pieces of data.

Hereinafter, for convenience of description, a case in which the data driver 112 receives the CEDS packet including the pixel data PDATA and the data control signal DCS from the timing controller 116 is described, but the disclosure is not limited thereto. The data driver 112 may receive each of the pixel data PDATA and the data control signal DCS from the timing controller 116.

The data driver 112 converts the pixel data PDATA in a digital form to analog positive/negative data signals according to the data control signal DCS to supply the analog positive/negative data signals to the pixels P through the plurality of data lines D1 to Dn.

The gate driver 114 receives a gate control signal GCS from the timing controller 116. The gate driver 114 supplies gate signals to the plurality of gate lines G1 to Gm according to the gate control signal GCS.

Specifically, the gate driver 114 generates gate signals (or scan signals) synchronized with the data signals under control of the timing controller 116, and sequentially supplies the gate signals to the gate lines G1 to Gm while shifting the generated gate signals. To this end, the gate driver 114 may include a plurality of gate drive ICs (not shown). The gate drive ICs may sequentially supply the gate signals synchronized with the data signals to the plurality of gate lines G1 to Gm under the control of the timing controller 116 to select the data line on which the data signal is written. The gate signal may swing between a gate high voltage and a gate low voltage.

The timing controller 116 receives digital video data VDATA and timing signals TSS from the host system 110. The timing signals TSS may include a reference clock signal (for example, a dot clock), a vertical synchronization signal, a horizontal synchronization signal, a data enable signal, and the like. The vertical synchronization signal is a signal which defines one frame period. The horizontal synchronization signal is a signal which defines one horizontal period necessary for supplying the data signals to the pixels P in one horizontal line of the display panel 105. The data enable signal is a signal which defines a period in which valid data is input. The dot clock is a signal repeated with a predetermined short cycle.

The timing controller 116 includes a data processing unit (not shown) which generates the pixel data PDATA, the data control signal DCS, and the gate control signal GCS using the digital video data VDATA and the timing signals TSS.

The data processing unit of the timing controller 116 may generate the data control signal DCS for controlling an operation timing of the data driver 112 and the gate control signal GCS for controlling an operation timing of the gate driver 114 based on the timing signals TSS to control the operation timings of data driver 112 and the gate driver 114.

The data processing unit of the timing controller 116 may convert the digital video data VDATA to the pixel data PDATA by aligning the digital video data VDATA to coincide with a pixel structure formed on the display panel 105. For example, the data processing unit may convert digital video data VDATA for three colors (red, green, and blue) to pixel data PDATA for four colors (white, red, green, and blue) and align the pixel data PDATA using a predetermined conversion method. Further, the data processing unit may also correct the pixel data PDATA through various types of image processing such as image quality compensation, external compensation, deterioration compensation, logo compensation, and the like.

Specifically, the display device 100 according to one embodiment of the disclosure includes a logo detection module 115 for logo compensation. As shown in FIG. 1, the logo detection module 115 may be included in the timing controller 116, but the disclosure is not limited thereto. In another embodiment, the logo detection module 115 may be included in a configuration other than the timing controller 116, or may be a separate independent configuration.

The logo detection module 115 may detect a logo in the digital video data VDATA for each frame, and generate a logo compensation signal when the logo is detected. The logo detection module 115 may provide the logo compensation signal to the data processing unit of the timing controller 116. The data processing unit of the timing controller 116 may correct the pixel data PDATA according to the logo compensation signal. A detailed description of the logo detection module 115 will be described below with reference to FIGS. 2 to 7.

The timing controller 116 outputs the pixel data PDATA and the data control signal DCS to the data driver 112 during a display driving period, and outputs the gate control signal GCS to the gate driver 114.

The host system 110 converts the digital video data VDATA to a format suitable to be displayed on the display panel 105. The host system 110 transmits the timing signals TSS together with the digital video data VDATA to the timing controller 116. The host system 110 may be implemented as any one of a television system, a set-top box, a navigation system, a digital versatile disc (DVD) player, a Blu-ray player, an electronic board, a kiosk system, a personal computer (PC), a home theater system, and a phone system to receive an input image.

Figure 2:
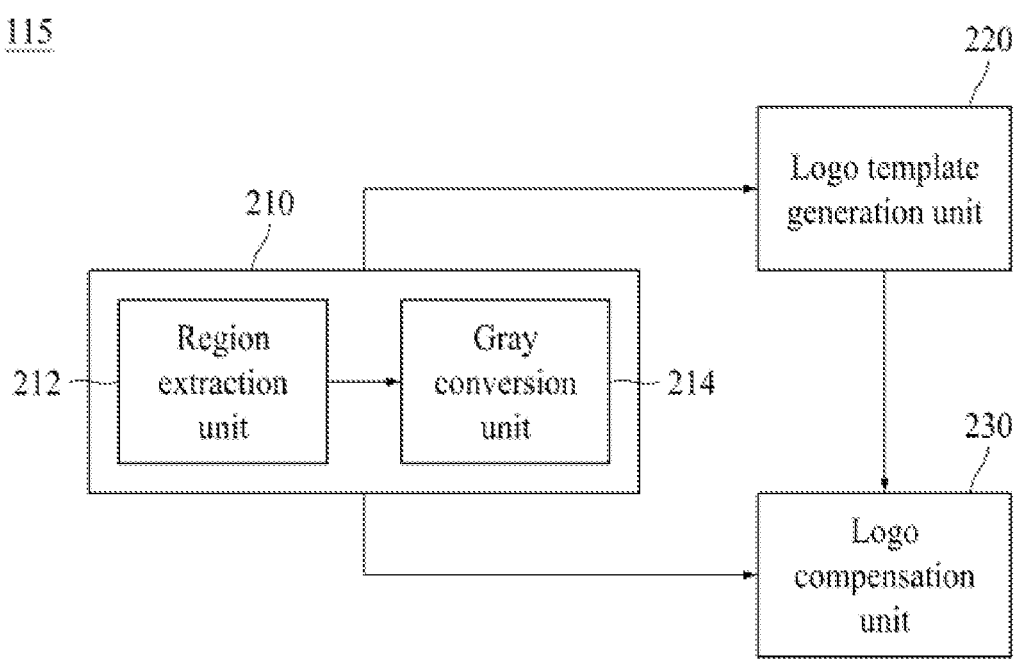
FIG. 2 is a block diagram illustrating a configuration of a logo detection module shown in FIG. 1.
Figure 3:
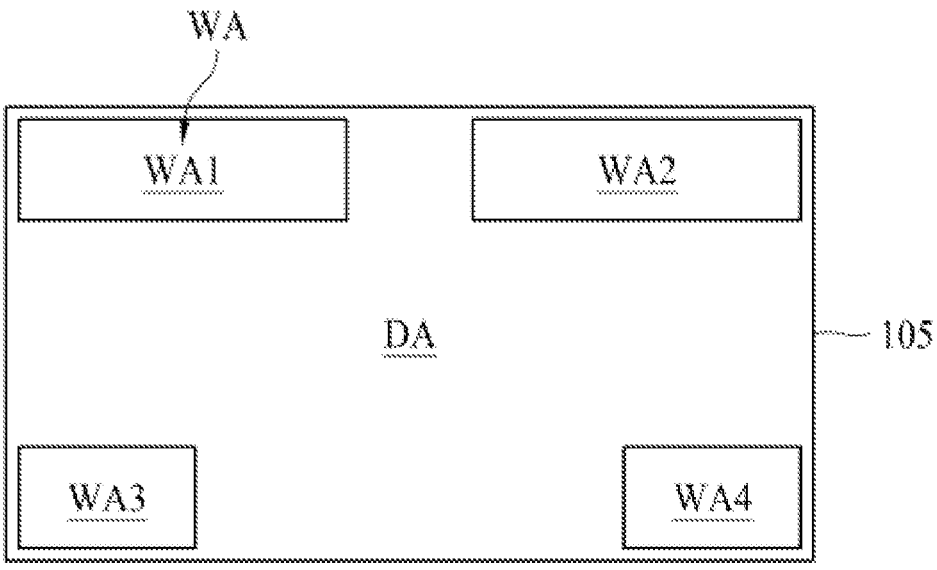
FIG. 3 is a view for describing a logo detection window region.
Figure 4:
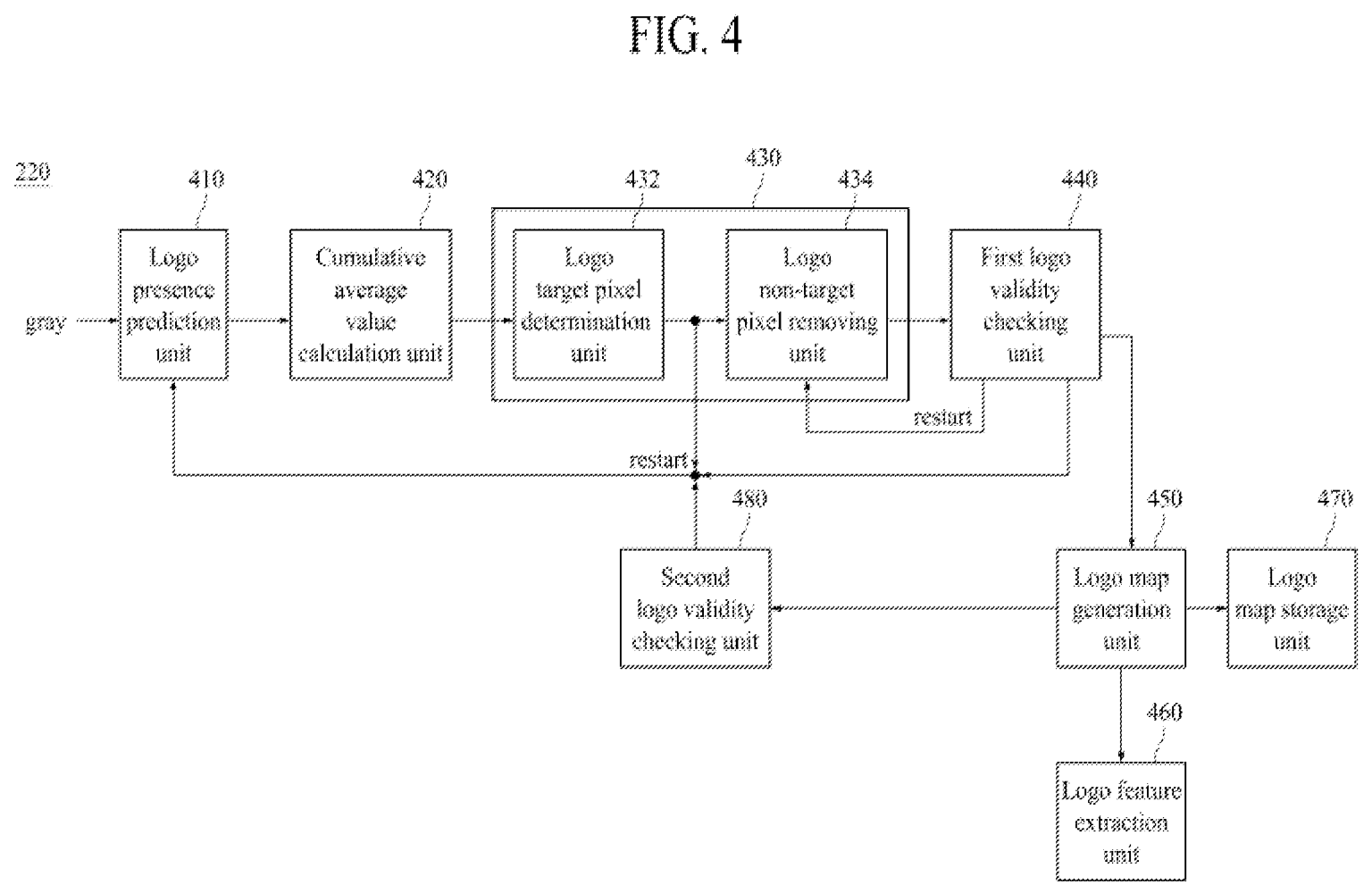
Figure 6:
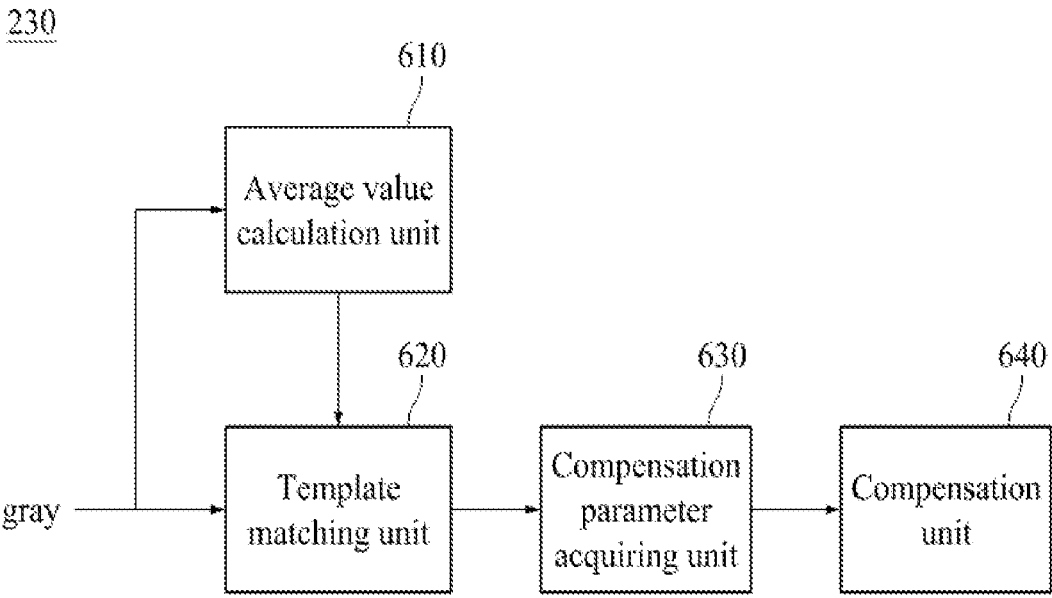
FIG. 6 is a block diagram illustrating a configuration of a logo compensation unit in FIG. 2.
Figure 7:
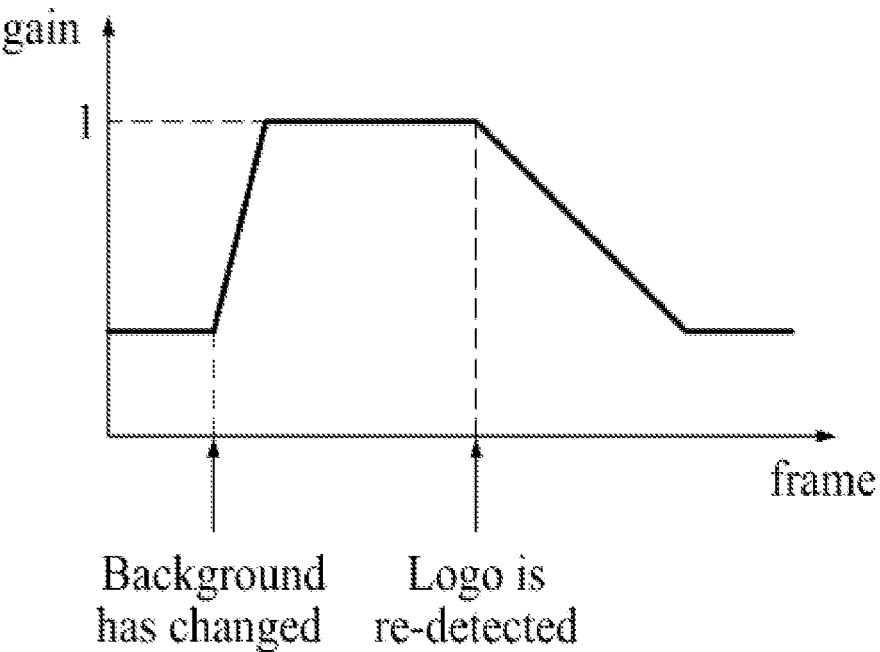
FIG. 7 is a graph for describing a change in a compensation gain value according to a background change.

FIG. 2 is a block diagram illustrating a configuration of the logo detection module shown in FIG. 1, FIG. 3 is a view for describing a logo detection window region, FIG. 4 is a block diagram illustrating a configuration of a logo template generation unit in FIG. 2, and FIG. 5 is a view illustrating an example of a logo map. FIG. 6 is a block diagram illustrating a configuration of a logo compensation unit in FIG. 2, and FIG. 7 is a graph for describing a change in a compensation gain value according to a background change.

Referring to FIGS. 2 to 7, the logo detection module 115 detects a logo in the digital video data VDATA input from the host system 110, and generates a logo compensation signal when the logo is detected. To this end, the logo detection module 115 includes a preprocessing unit 210, a logo template generation unit 220, and a logo compensation unit 230.

The preprocessing unit 210 preprocesses the digital video data VDATA to acquire a gray value for each of the plurality of pixels. In this case, the digital video data VDATA may include image data of a plurality of frames, and the image data of the plurality of frames may be divided into first image data and second image data according to whether a logo map is present. The first image data may be image data input when the logo map is not present, that is, before the logo map is generated. The second image data may be image data input when the logo map is present, that is, after the logo map is generated.

The preprocessing unit 210 may include a region extraction unit 212 and a gray conversion unit 214 to perform preprocessing on the image data for each frame.

The region extraction unit 212 may extract partial image data corresponding to a predetermined logo detection window region WA from the image data when the image data of one frame is input. As shown in FIG. 3, the logo detection window region WA may correspond to a region having a high probability of logo detection within the display region DA where the image is displayed on the display panel 105. The logo detection window region WA may be determined based on a statistical analysis for a region where the logo is detected in various images.

At least one logo detection window region WA may be set in consideration of a logo detection frequency. For example, as shown in FIG. 3, the logo detection window region WA may include a first logo detection window region WA1 at an upper left corner, a second logo detection window region WA2 at an upper right corner, and a third logo detection window region WA3 at a lower left corner, and a fourth logo detection window region WA4 at a lower right corner. As a result of the statistical analysis for the region where the logo is detected, when the logo detection frequency appears in the order of the first logo detection window region WA1, the second logo detection window region WA2, the third logo detection window region WA3, and the fourth logo detection window region WA4, the first logo detection window region WA1 and the second logo detection window region WA2 may be finally determined as the logo detection window regions WA. Alternatively, all of the first to fourth logo detection window regions WA1, WA2, WA3, and WA4 may be finally determined as the logo detection window regions WA.

When there are a plurality of logo detection window regions WA, the region extraction unit 212 may extract partial image data for each of the plurality of logo detection window regions WA. For example, when the logo detection window region WA includes the first logo detection window region WA1 and the second logo detection window region WA2, the region extraction unit 212 may extract first region image data corresponding to the first logo detection window region WA1 from the image data, and may extract second region image data corresponding to the second logo detection window region WA2 from the image data.

The gray conversion unit 214 acquires the gray value of each of the plurality of pixels included in the logo detection window region WA using the extracted partial image data. The partial image data may include an RGB pixel value of each of the plurality of pixels included in the logo detection window region WA. The gray conversion unit 214 may acquire the gray values using the RGB pixel values of the plurality of pixels included in the partial image data.

In one embodiment, the gray conversion unit 214 may acquire the gray value of each of the plurality of pixels included in the logo detection window region WA using Equation 1 below.

$$gray = (R+G+B)/3 \qquad \text{[Equation 1]}$$

Here, gray indicates a gray value of the corresponding pixel, R indicates a red value of the corresponding pixel, G indicates a green value of the corresponding pixel, and B indicates a blue value of the corresponding pixel. Since the preprocessing unit 210 of the logo detection module 115 simply targets detection of the logo rather than improvement of image quality, the same weight ⅓ may be applied to the red value, the green value, and the blue value.

The logo detection module 115 according to one embodiment of the disclosure may convert the RGB value including the values for three colors to the gray value, which is a value for one color, through the preprocessing unit 210 to reduce the memory necessary for logo detection.

The preprocessing unit 210 may provide the gray values of the plurality of pixels acquired using the partial image data to the logo template generation unit 220 or the logo compensation unit 230 according to the presence or absence of the logo map.

When the logo map is not present, the preprocessing unit 210 may extract first partial image data corresponding to the predetermined logo detection window region WA from the first image data input before the logo map is generated. The preprocessing unit 210 may acquire the gray value of each of the plurality of pixels included in the logo detection window region WA using the first partial image data. The preprocessing unit 210 may provide the gray value of each of the plurality of pixels acquired using the first partial image data to the logo template generation unit 220.

When the logo map is present, the preprocessing unit 210 may extract second partial image data corresponding to the predetermined logo detection window region WA from the second image data input after the logo map is generated. The preprocessing unit 210 may acquire the gray value of each of the plurality of pixels included in the logo detection window region WA using the second partial image data. The preprocessing unit 210 may provide the gray value of each of the plurality of pixels acquired using the second partial image data to the logo compensation unit 230.

The logo template generation unit 220 generates a logo map using the first partial image data provided from the preprocessing unit 210. In one embodiment, when there are a plurality of logo detection window regions WA, the logo template generation unit 220 may generate a logo map for each of the plurality of logo detection window regions WA. Specifically, the logo template generation unit 220 may receive the first region image data for the first logo detection window region WA1 and the second region image data for the second logo detection window region WA2 from the preprocessing unit 210. The logo template generation unit 220 may generate a first logo map based on the first region image data and generate a second logo map based on the second region image data.

As shown in FIG. 4, the logo template generation unit 220 includes a cumulative average value calculation unit 420, a logo pixel determination unit 430, a logo map generation unit 450, and a logo map storage unit 470. In one embodiment, the logo template generation unit 220 may include at least one among a logo presence prediction unit 410, a first logo validity checking unit 440, a logo feature extraction unit 460, and a second logo validity checking unit 480.

The logo presence prediction unit 410 predicts the presence of a logo in the logo detection window region WA. Specifically, the logo presence prediction unit 410 may predict whether the first partial image data includes the logo. The logo presence prediction unit 410 may predict the presence of the logo based on the number of pixels expected to be a logo among the plurality of pixels included in the first partial image data.

In one embodiment, the logo presence prediction unit 410 may determine a pixel whose gray value is greater than or equal to a first reference value as a logo. In this case, the logo presence prediction unit 410 may check the number of pixels having gray values greater than or equal to the first reference value among the plurality of pixels included in the first partial image data, and may predict that the first partial image data includes the logo when the checked number of pixels is greater than or equal to a first value.

The cumulative average value calculation unit 420 calculates a cumulative gray average value for each pixel using the first partial image data input for a first set time. The cumulative average value calculation unit 420 may calculate the cumulative gray average value for each pixel based on the gray values of the plurality of pixels included in the first partial image data.

In one embodiment, the cumulative average value calculation unit 420 may cumulatively sum the gray values for each of the plurality of pixels included in the first partial image data for each input of the first image data of one frame. When the first set time is completed, the cumulative average value calculation unit 420 may calculate the cumulative gray average value by dividing the cumulatively summed gray values by the total number of frames.

For example, to describe, the cumulative average value calculation unit 420 may include an accumulation buffer (not shown) which stores the gray value for each of the plurality of pixels. In the accumulation buffer, 0 may be stored as an initial value. When the first partial image data is input, the cumulative average value calculation unit 420 may store the gray value of each of the plurality of pixels included in the first partial image data in the accumulation buffer. In this case, the cumulative average value calculation unit 420 may add the corresponding gray values to the values stored in the accumulation buffer, and store the summed value in the accumulation buffer. The cumulative average value calculation unit 420 may calculate the cumulative gray average value by dividing the cumulative gray values stored in the accumulation buffer by the number of frames when the first set time, for example, five seconds, has elapsed. Here, the number of frames may indicate the number of frames of image data input for five seconds.

In another embodiment, the cumulative average value calculation unit 420 may calculate the cumulative gray average value for each of the plurality of pixels included in the first partial image data based on the gray value for each input of the first image data of one frame.

For example, to describe, the cumulative average value calculation unit 420 may include an accumulation buffer (not shown) which stores a cumulative gray average value for each of the plurality of pixels. In the accumulation buffer, 0 may be stored as an initial value. When the first partial image data is input, the cumulative average value calculation unit 420 may calculate a new cumulative gray average value based on the gray value of each of the plurality of pixels included in the first partial image data and a cumulative gray average value up to a previous frame stored in the accumulation buffer.

Specifically, the accumulation buffer may store the calculated cumulative gray average value for each pixel based on the first partial image data from a first frame to an N−1th frame. When the image data of the Nth frame is input, the cumulative average value calculation unit 420 may calculate a new cumulative gray average value for each pixel based on the gray value of each of the plurality of pixels included in the first partial image data of the Nth frame and the cumulative gray average value for each pixel stored in the accumulation buffer. Further, the cumulative average value calculation unit 420 may update the accumulation buffer with the new cumulative gray average value for each pixel.

The embodiment in which the cumulative gray average value is calculated for each input of the first image data of one frame as described above has an advantage in that a memory capacity may be reduced compared to an embodiment in which the gray value is cumulatively summed for each input of the first image data of one frame. In the embodiment in which the gray value is cumulatively summed for each input of the first image data of one frame, a bit-depth of the memory is increased to store the cumulatively summed gray value, and accordingly, the memory capacity may be increased.

Meanwhile, the cumulative average value calculation unit 420 may calculate a cumulative gray average value regardless of whether the logo is present when the first partial image data is input, but the disclosure is not limited thereto.

In one embodiment, when it is predicted that the first partial image data includes the logo by the logo presence prediction unit 410, the cumulative average value calculation unit 420 may calculate the cumulative gray average value for each pixel using the first partial image data input for the first set time. When the first partial image data does not include the logo, since the cumulative gray average value for each pixel is not calculated, the logo detection module 115 according to one embodiment of the disclosure may reduce the load according to calculation and shorten a logo detection time.

The logo pixel determination unit 430 determines a logo pixel among the plurality of pixels included in the logo detection window region WA. The logo pixel determination unit 430 may determine the logo pixel among the plurality of pixels included in the first partial image data based on the cumulative gray average value for each pixel.

Specifically, the logo pixel determination unit 430 includes a logo target pixel determination unit 432 and a logo non-target pixel removing unit 434.

The logo target pixel determination unit 432 may determine at least two or more pixels among the plurality of pixels as logo target pixels based on the cumulative gray average value. The logo target pixel determination unit 432 may check the cumulative gray average value of each of the plurality of pixels calculated by the cumulative average value calculation unit 420, and since the logo has a high probability of high luminance, the logo target pixel determination unit 432 may determine the pixels whose cumulative gray average values exceed a first threshold value as logo target pixels. On the other hand, the logo target pixel determination unit 432 may determine pixels whose cumulative gray average values are smaller than or equal to the first threshold value among the plurality of pixels as normal pixels.

The logo target pixel determination unit 432 may check the number of logo target pixels, and may initialize the cumulative gray average value for each pixel stored in the accumulation buffer when the number of logo target pixels is smaller than a second value.

The logo non-target pixel removing unit 434 removes logo non-target pixels from the logo target pixels using the first partial image data input after the logo target pixels are determined.

The logo non-target pixel removing unit 434 may determine the logo non-target pixels based on the gray change value. The logo non-target pixel removing unit 434 may acquire a gray value of a pixel corresponding to the logo target pixel from the first partial image data input after the logo target pixels are determined. The logo non-target pixel removing unit 434 may calculate a difference between the acquired gray value and the cumulative gray average value of the logo target pixel, and determine the pixel whose calculated difference exceeds the second threshold value as the logo non-target pixel.

Further, the logo non-target pixel removing unit 434 may calculate a new cumulative gray average value using the gray values of the plurality of pixels included in the first partial image data input after the logo target pixels are determined. In this case, the logo non-target pixel removing unit 434 may reduce the newly calculated cumulative gray average value for quick convergence when the difference between the acquired gray value and the cumulative gray average value of the logo target pixel is too large. For example, the logo non-target pixel removing unit 434 may divide the newly calculated cumulative gray average value by 2 when the difference between the acquired gray value and the cumulative gray average value of the logo target pixel exceeds a third threshold value.

According to one embodiment, the logo non-target pixel removing unit 434 may differently set a reduction rate of the newly calculated cumulative gray average value according to the difference between the acquired gray value and the cumulative gray average value of the logo target pixel. The logo non-target pixel removing unit 434 may set the reduction rate to be larger as the difference between the acquired gray value and the cumulative gray average value of the logo target pixel is larger.

As described above, even when the difference between the acquired gray value and the cumulative gray average value is large, the logo non-target pixel removing unit 434 may quickly reduce the difference between the acquired gray value and the cumulative gray average value through several frames without reducing the cumulative gray average value.

The logo non-target pixel removing unit 434 may remove the determined logo non-target pixels from the logo target pixels. The logo non-target pixel removing unit 434 may check the number of logo target pixels, and may initialize the cumulative gray average value for each pixel stored in the accumulation buffer when the number of logo target pixels is smaller than the second value. Further, the logo non-target pixel removing unit 434 may cause the first set time of the cumulative average value calculation unit 420 to be reset and the cumulative gray average value for each pixel to be recalculated.

Since the logo is not normally changed, the logo non-target pixel removing unit 434 may determine the remaining logo target pixels, which are not removed, as logo pixels when there is no change in the number of logo target pixels for a second set time.

The first logo validity checking unit 440 checks whether the logo including the logo pixels determined by the logo pixel determination unit 430 is valid. Specifically, the first logo validity checking unit 440 may generate size information of the logo based on the logo pixels determined by the logo pixel determination unit 430. The size information of the logo may include at least one among the number of logo pixels, a shape of the logo, an area of the logo, a length of the logo, a height of the logo, a ratio of the logo, and a position of the logo pixel.

For example, the first logo validity checking unit 440 may determine the length of the logo based on an X-axis coordinate of the rightmost logo pixel and an X-axis coordinate of the leftmost logo pixel in the logo detection window region WA. Further, the first logo validity checking unit 440 may determine the height of the logo based on a Y-axis coordinate of the uppermost logo pixel and a Y-axis coordinate of the lowermost logo pixel in the logo detection window region WA. The first logo validity checking unit 440 may determine the ratio of the logo based on the length of the logo and the height of the logo.

The first logo validity checking unit 440 may check logo validity based on the size information of the logo. The first logo validity checking unit 440 may determine whether the logo composed of the logo pixels determined by the logo pixel determination unit 430 is included in a logo validity range. The logo validity range is a range which is valid as the logo, and may include a validity range for at least one among the number of logo pixels, the shape of the logo, the area of the logo, the length of the logo, the height of the logo, the ratio of the logo, and the position of the logo pixel.

For example, the first logo validity checking unit 440 may determine that the logo is valid when the length of the logo composed of the logo pixels determined by the logo pixel determination unit 430 is included in the logo validity range. On the other hand, the first logo validity checking unit 440 may determine that the logo is invalid when the length of the logo composed of the logo pixels determined by the logo pixel determination unit 430 is too large and thus is outside the logo validity range.

When it is determined that the logo is invalid, the first logo validity checking unit 440 may cause the logo pixel determination unit 430 to determine the logo pixels again.

In one embodiment, when it is determined that the logo is invalid, the first logo validity checking unit 440 may cause the second set time to be reset and the logo non-target pixels from the logo pixels, that is, the remaining logo target pixels to be removed by the logo non-target pixel removing unit 434.

When it is determined by the first logo validity checking unit 440 that the logo is valid, the logo map generation unit 450 generates a logo map which indicates the logo pixels. As shown in FIG. 5, the logo map generation unit 450 may generate a logo map in which a pixel corresponding to a logo pixel LP has '1' and a pixel corresponding to a normal pixel NLP has '0'.

In one embodiment, the logo map generation unit 450 may remove a logo pixel corresponding to an isolated point from the logo pixels. The logo map generation unit 450 may remove the logo pixel corresponding to the isolated point from the logo pixels using a max filter.

The logo feature extraction unit 460 extracts features from the logo composed of the logo pixels. The logo feature extraction unit 460 may extract at least one among a logo type, a logo size, and a logo average gray value as a logo feature. The logo type may be at least one of an opaque logo, a translucent logo, and a letterbox-type logo. The logo feature extraction unit 460 may provide the extracted logo feature to the logo compensation unit 230.

The logo map storage unit 470 stores the logo map generated by the logo map generation unit 450. The logo map storage unit 470 may map the gray value to the logo map to store the result as a logo template. The gray value mapped to the logo map may correspond to the cumulative gray average value of the corresponding pixel. The cumulative gray average value may be acquired from the accumulation buffer.

The second logo validity checking unit 480 checks whether the logo is valid using the logo map by the logo map generation unit 450. In one embodiment, the second logo validity checking unit 480 may check whether the logo of the logo map corresponds to a portion. The second logo validity checking unit 480 may determine that the logo of the logo map corresponds to the portion and is invalid when the logo pixel which is '1' in the logo map is on a boundary line of the logo detection window region WA.

When it is determined that the logo of the logo map is invalid, the second logo validity checking unit 480 may initialize the cumulative gray average value for each pixel stored in the accumulation buffer. Further, the second logo validity checking unit 480 may cause the first set time of the cumulative average value calculation unit 420 to be reset and the cumulative gray average value for each pixel to be recalculated.

Referring to FIG. 2 again, the logo compensation unit 230 compares the second image data input after the logo map is generated and the logo map generated by the logo template generation unit 220 to determine whether to detect a logo for the second image data. The logo compensation unit 230 may compare the second partial image data provided from the preprocessing unit 210 and the logo map generated by the logo template generation unit 220 to determine whether to detect a logo. Here, the second partial image data may correspond to partial image data extracted from the second image data input after the logo map is generated.

In one embodiment, when there are a plurality of logo detection window regions WA, the logo compensation unit 230 may compare the second partial image data for each of the plurality of logo detection window regions WA and the corresponding logo map. Specifically, the logo compensation unit 230 may receive the first region image data for the first logo detection window region WA1 and the second region image data for the second logo detection window region WA2 from the preprocessing unit 210. The logo compensation unit 230 may compare the first region image data and the first logo map to determine whether to detect a logo in the first logo detection window region WA1. The logo compensation unit 230 may compare the second region image data and the second logo map to determine whether to detect a logo in the second logo detection window region WA2.

As shown in FIG. 6, this logo compensation unit 230 includes a template matching unit 620, a compensation parameter acquiring unit 630, and a compensation unit 640. In one embodiment, the logo compensation unit 230 may further include an average value calculation unit 610.

The template matching unit 620 matches the plurality of pixels included in the second partial image data and the logo pixels included in the logo map to calculate a matching rate. Specifically, the template matching unit 620 may extract the pixels corresponding to the logo pixels included in the logo map from the plurality of pixels included in the second partial image data as logo target pixels. The template matching unit 620 may compare the gray value of each of the extracted logo target pixels and the gray value of the corresponding logo pixel to calculate the matching rate.

The template matching unit 620 may calculate the matching rate based on a first difference value between the gray value of the logo target pixel of the second partial image data and the gray value of the logo pixel of the corresponding logo map. In this case, the gray value of the logo pixel may correspond to the cumulative gray average value of the logo pixel calculated by the logo template generation unit 220.

The template matching unit 620 may calculate the first difference value for each of the plurality of logo pixels, and normalize the sum of the first difference values to the number of logo pixels to calculate the matching rate.

Meanwhile, in the translucent logo, the logo pixel values may be changed according to the degree of alpha blending. That is, in the translucent logo, the logo pixel values may vary according to a background pixel value of an image which is present as a background behind the logo. In consideration of this, the gray value of the logo target pixel of the second partial image data may greatly vary according to the background, and in this case, since a difference with the gray value of the logo pixel of the logo map may increase, the matching rate may be lowered. Due to the low matching rate, a problem in that the logo is not detected even in the case of the same logo may occur.

In order to solve this problem, the template matching unit 620 may add a compensation value according to the background to the gray value of the logo target pixel to calculate the matching rate. For accurate compensation, the background pixel value should be extracted in units of pixels, but when there is no logo, it is difficult to predict the background pixel value, and complicated calculations may be added. Accordingly, the template matching unit 620 may perform approximation using a gray average value in a specific region.

The template matching unit 620 may determine a second difference value between a gray average value of the second partial image data and a gray average value of the logo map as a compensation value according to the background. The gray average value of the second partial image data may be calculated by the average value calculation unit 610. The average value calculation unit 610 may sum the gray values of the plurality of pixels included in the second partial image data, and may divide the summed value by the number of pixels to calculate the gray average values of the plurality of pixels. The average value calculation unit 610 may provide the calculated gray average value of the second partial image data to the template matching unit 620.

The gray average value of the logo map may be provided from the logo template generation unit 220. The logo feature extraction unit 460 of the logo template generation unit 220 may sum the gray values of the plurality of pixels included in the logo map, and may divide the summed value by the number of logo pixels to calculate the gray average values of the plurality of logo pixels. The logo feature extraction unit 460 of the logo template generation unit 220 may provide the calculated gray average value of the logo map to the template matching unit 620.

In one embodiment, the template matching unit 620 may calculate the matching rate based on the first difference value and the second difference value between the gray average value of the second partial image data and the gray average value of the logo map.

In one embodiment, the template matching unit 620 may calculate a matching value of the logo map and the second partial image data using Equation 2.

$$\text{matching}[n]=|\text{gray}[n]+del-\text{logowin}[n]| \qquad \text{[Equation 2]}$$

n indicates the number of pixels to be matched, matching [n] indicates a matching value between an nth logo pixel of the logo map and an nth logo target pixel of the second partial image data, gray indicates a gray value of the nth logo target pixel of the second partial image data, logowin indicates a gray value of the nth logo pixel of the logo map, and del indicates a compensation value according to the background.

The template matching unit 620 may sum the matching values of the logo target pixels for each of the plurality of logo pixels to calculate a final matching value of the logo map and the second partial image data. The template matching unit 620 may calculate a matching rate between the logo map and the second partial image data using Equation 3.

$$\text{matchingrates}=100*(255-(\text{matching}/n))/255 \qquad \text{[Equation 3]}$$

matching indicates the final matching value between the logo map and the second partial image data, and matchingrates indicates the matching rate between the logo map and the second partial image data.

The template matching unit 620 determines whether the logo is present based on the matching rate. When the matching rate is greater than or equal to a fourth threshold value, the template matching unit 620 may determine that the corresponding second partial image data includes the logo. On the other hand, when the matching rate is smaller than the fourth threshold value, the template matching unit 620 may determine that the corresponding second partial image data does not include the logo. For example, when the matching rate is greater than or equal to 90%, the template matching unit 620 may determine that the corresponding second partial image data includes the logo.

Further, when it is determined that the logo is present, the template matching unit 620 may determine the type of logo based on the compensation value according to the background. When the compensation value according to the background is greater than or equal to a fifth threshold value, the template matching unit 620 may determine that the logo included in the corresponding second partial image data is a translucent logo. Meanwhile, when the compensation value according to the background is smaller than the fifth threshold value, the template matching unit 620 may determine that the logo included in the corresponding second partial image data is an opaque logo. For example, when the compensation value according to the background is greater than or equal to 16, the template matching unit 620 may determine that the logo included in the corresponding second partial image data is a translucent logo.

The compensation parameter acquiring unit 630 acquires compensation parameters necessary for logo compensation. The compensation parameters may include at least one among the number of logo edge pixels, a lower limit value of the number of logo edge pixels, a logo edge pixel number ratio, a lower limit value of the logo edge pixel number ratio, an initial matching rate, an allowable change rate of the matching rate, a lower limit value of the matching rate, a waiting time, and a gain application time.

The compensation parameter acquiring unit 630 may check edge pixels among the logo target pixels of the second partial image data to acquire the number of logo edge pixels or the logo edge pixel number ratio. When the number of logo edge pixels is small or 0, since the logo is surrounded by a background of the same color, logo compensation may be unnecessary. In order to check this, the compensation parameter acquiring unit 630 may acquire the number of logo edge pixels or the r logo edge pixel number ratio. Further, the compensation parameter acquiring unit 630 may set the lower limit value of the number of logo edge pixels and the lower limit value of the logo edge pixel number ratio according to a user input.

The compensation parameter acquiring unit 630 may determine the matching rate calculated by the template matching unit 620 when an initial logo is detected as an initial matching rate. Further, the compensation parameter acquiring unit 630 may set the allowable change rate of the matching rate according to a user input. The compensation parameter acquiring unit 630 may acquire the lower limit value of the matching rate by subtracting the allowable change rate of the matching rate from the initial matching rate. When a change in the matching rate is large, it may be determined that a screen has changed or the logo has changed. In this case, since it is preferable to search for a new logo, the compensation parameter acquiring unit 630 may acquire the lower limit value of the matching rate and provide the lower limit value of the matching rate to the compensation unit 640. For example, when the initial matching rate is 90% and the allowable change rate of the matching rate is set to 5%, the compensation parameter acquiring unit 630 may acquire 85% as the lower limit value of the matching rate.

In one embodiment, the allowable change rate of the matching rate may be set to one among 3 to 5% regardless of the logo type. For example, the compensation parameter acquiring unit 630 may set the allowable change rate of the matching rate to 5%.

In another embodiment, the allowable change rate of the matching rate may be differently set according to the logo type. For example, when the logo type is an opaque logo, since the opaque logo does not have a large change rate, the compensation parameter acquiring unit 630 may set the allowable change rate of the matching rate to 3%. Meanwhile, when the logo type is a translucent logo, since the translucent logo has a large change rate according to the background, the compensation parameter acquiring unit 630 may set the allowable change rate of the matching rate to 5%.

The compensation parameter acquiring unit 630 may set the waiting time according to a user input. The waiting time may be a time for waiting before searching for a new logo because conditions are not met. Here, the conditions may include a condition in which the number of logo edge pixels exceeds the lower limit value of the number of logo edge pixels, a condition in which the logo edge pixel number ratio exceeds the lower limit value of the logo edge pixel number ratio, and a condition in which the matching rate exceeds the lower limit value of the matching rate.

The compensation parameter acquiring unit 630 may set the gain application time according to a user input. As shown in FIG. 7, the logo detection module 115 according to one embodiment of the disclosure may perform logo compensation while gradually decreasing or increasing a compensation gain to prevent a sudden change in the compensation gain. The gain application time may correspond to a time at which the compensation gain reaches a final compensation gain while being decreased or increased.

The compensation unit 640 performs the logo compensation for pixels included in the region where the logo is detected. The compensation unit 640 may perform the logo compensation by reducing the luminance of pixels included in the region where the logo is detected. The compensation unit 640 may multiply a luminance value by a compensation gain having a value smaller than 1 to reduce the luminance of the pixel. In this case, the compensation gain may have a value from 0 to 1.

The compensation unit 640 may directly change the luminance of pixels included in the region where the logo is detected in the second image data, but the disclosure is not limited thereto. In another embodiment, the compensation unit 640 may generate a logo compensation signal for logo compensation and transmit the generated logo compensation signal to the data processing unit of the timing controller 116.

Meanwhile, the compensation unit 640 may determine whether to perform logo compensation based on the compensation parameters acquired by the compensation parameter acquiring unit 630, and may perform logo compensation when the logo compensation is determined.

The compensation unit 640 may determine whether to perform logo compensation based on the number of logo edge pixels or the logo edge pixel number ratio. Specifically, the compensation unit 640 may determine that logo compensation is unnecessary when the number of logo edge pixels is smaller than the lower limit value of the number of logo edge pixel or the logo edge pixel number ratio is smaller than the lower limit value of the logo edge pixel number ratio. In this case, the compensation unit 640 may not perform logo compensation. When logo compensation is being performed, the compensation unit 640 may change the compensation gain to 1. Thereafter, when the number of logo edge pixels is greater than or equal to the lower limit value of the number of logo edge pixels or the logo edge pixel number ratio is greater than or equal to the lower limit value of the logo edge pixel number ratio within the waiting time, the compensation unit 640 may change the compensation gain to a value smaller than 1. Meanwhile, the compensation unit 640 may cause the logo template generation unit 220 to start a new logo search when the waiting time is exceeded.

For example, to describe, the number of logo edge pixels may vary according to the background change. When the background has the same color as the logo, the logo edge pixel number ratio may be smaller than the lower limit value of the logo edge pixel number ratio. In this case, as shown in FIG. 7, the compensation unit 640 may change the compensation gain to 1. In this case, the compensation unit 640 may control the compensation gain to gradually increase to have a visually natural change.

Thereafter, when the logo is re-detected as the background changes within the waiting time, the logo edge pixel number ratio may be greater than the lower limit value of the logo edge pixel number ratio again. As shown in FIG. 7, the compensation unit 640 may change the compensation gain to a value smaller than 1 as before. In this case, the compensation unit 640 may control the compensation gain to gradually decrease based on the gain application time.

The compensation unit 640 may determine whether to perform logo compensation based on the change in the matching rate. Specifically, when the matching rate is smaller than the lower limit value of the matching rate, the compensation unit 640 may determine that the logo has changed. In this case, the compensation unit 640 may not perform logo compensation. In one embodiment, when the matching rate is maintained under the lower limit value of the matching rate for the waiting time, the compensation unit 640 may stop the present logo compensation, and cause the logo template generation unit 220 to start the new logo search.

The compensation unit 640 may determine a logo compensation range based on the logo type. Specifically, the compensation unit 640 may determine one of normal logo compensation and logo region compensation according to the logo type.

When the logo type is a letterbox-type logo, the compensation unit 640 may determine logo region compensation. In this case, the compensation unit 640 may perform logo compensation for a letterbox region including the logo expressed as letters, numbers, or the like. The letterbox region may be specified by an X-axis coordinate range and a Y-axis coordinate range. The compensation unit 640 may perform logo compensation for all pixels included in the letterbox region specified by the X-axis coordinate range and the Y-axis coordinate range.

Meanwhile, when the logo type is not a letterbox-type logo, the compensation unit 640 may determine normal logo compensation. The compensation unit 640 may perform logo compensation for the pixels in which the logo is detected.

Since the logo detection module 115 according to one embodiment of the disclosure generates a logo map using the cumulative gray average value, it may not be greatly affected by image noise, and thus a logo detection rate may be improved.

Further, since the logo detection module 115 according to one embodiment of the disclosure does not simply perform comparison with a pixel value of a previous frame but performs comparison with a gray average value cumulative for a predetermined time to be calculated, an average high value may be maintained even in a case of a translucent logo. Accordingly, the logo detection module 115 according to one embodiment of the disclosure may improve a detection rate for the translucent logo. Further, the logo detection module 115 according to one embodiment of the disclosure may further improve the detection rate for the translucent logo by also considering the compensation value according to the background when calculating the matching rate.

That is, the logo detection module 115 according to one embodiment of the disclosure may detect all types of logos from an opaque logo to a translucent logo and a letterbox-type logo, and has high detection accuracy.

Figure 8:
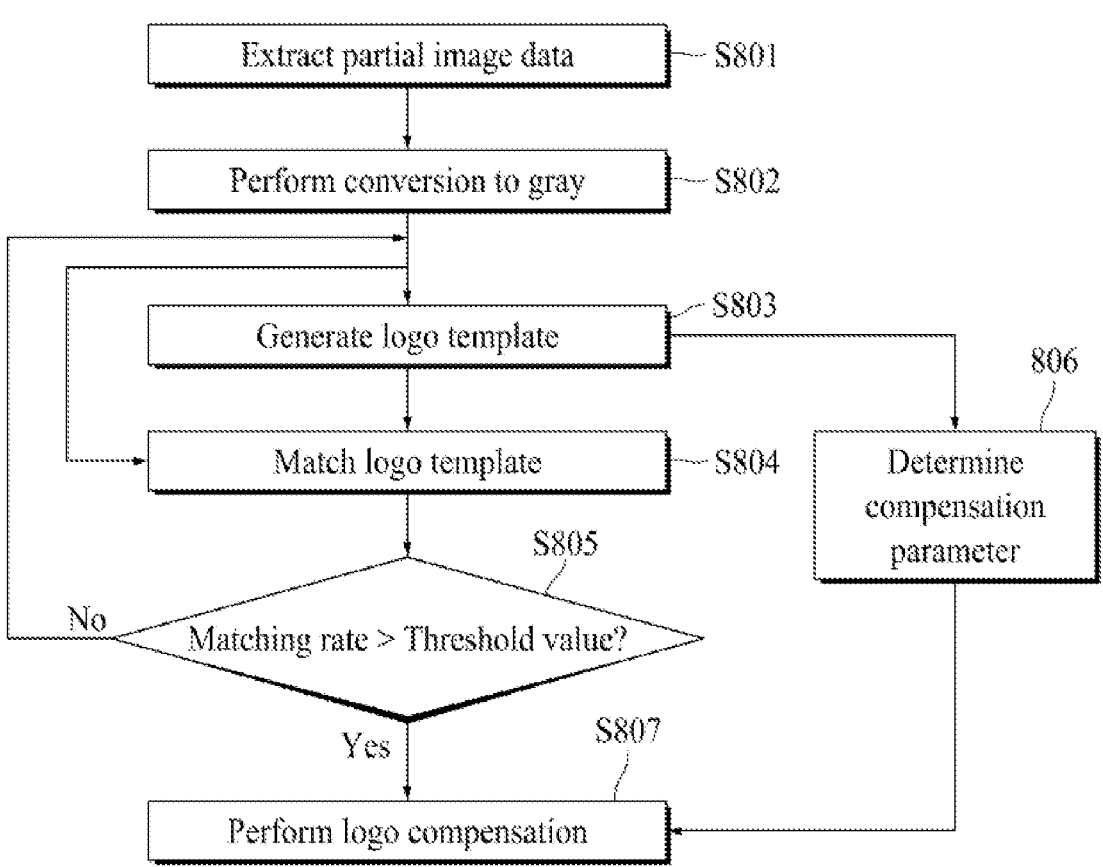
FIG. 8 is a flow chart illustrating a driving method of the logo detection module according to one embodiment of the disclosure.

FIG. 8 is a flow chart illustrating a driving method of the logo detection module according to one embodiment of the disclosure.

Referring to FIG. 8, first, the logo detection module 115 may extract partial image data corresponding to a predetermined logo detection window region WA from image data when the image data is input (S801).

When there are a plurality of logo detection window regions WA, the logo detection module 115 may extract the partial image data for each of the plurality of logo detection window regions WA. For example, when the logo detection window regions WA include a first logo detection window region WA1 and a second logo detection window region WA2, the logo detection module 115 may extract first region image data corresponding to the first logo detection window region WA1 from the image data, and may extract second region image data corresponding to the second logo detection window region WA2 from the image data.

Next, the logo detection module 115 converts an RGB pixel value of each of the plurality of pixels included in the logo detection window region WA to a gray value (S802).

The logo detection module 115 may acquire the gray value of each of the plurality of pixels included in the logo detection window region WA using the extracted partial image data. The partial image data may include the RGB pixel value of each of the plurality of pixels included in the logo detection window region WA. The logo detection module 115 may acquire the gray values using the RGB pixel values of the plurality of pixels included in the partial image data.

The partial image data may include the first partial image data and the second partial image data. The first partial image data may be partial image data extracted from the first image data input before the logo map is generated. The second partial image data may be the partial image data extracted from the second image data input after the logo map is generated.

Next, the logo detection module 115 generates a logo template using the first partial image data (S803). Hereinafter, a method of generating the logo template will be described in detail with reference to FIG. 9.

Figure 9:
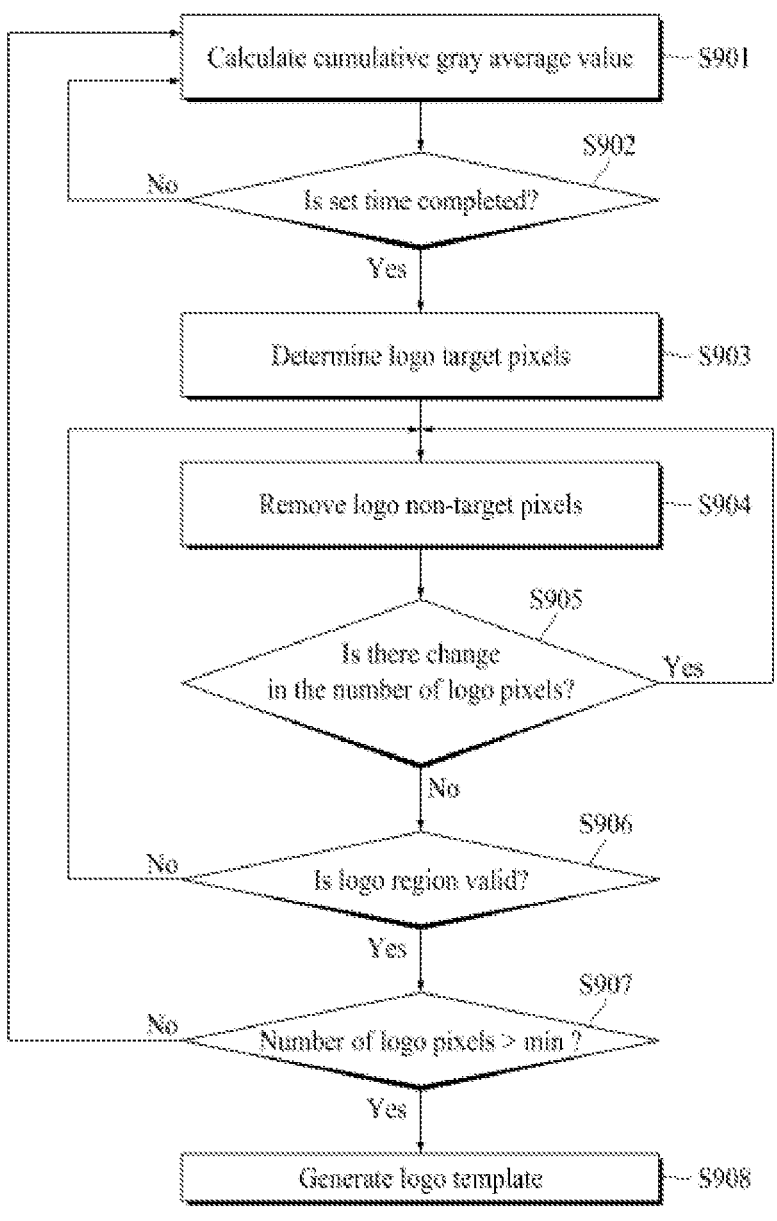
FIG. 9 is a flow chart illustrating a method of generating a logo template.

FIG. 9 is a flow chart illustrating the method of generating a logo template.

Referring to FIG. 9, first, the logo detection module 115 calculates a cumulative gray average value for each pixel using the first partial image data input for a first set time (S901).

The logo detection module 115 may calculate the cumulative gray average value for each pixel based on the gray values of the plurality of pixels included in the first partial image data. The logo detection module 115 may calculate the cumulative gray average value based on the gray value for each of the plurality of pixels included in the first partial image data for each input of the first image data of one frame.

Next, when the first set time is completed, the logo detection module 115 determine at least two or more pixels among the plurality of pixels as logo target pixels based on the cumulative gray average value (S902 and S903).

The logo detection module 115 may check the calculated cumulative gray average value of each of the plurality of pixels, and may determine the pixels whose cumulative gray average values exceed a first threshold value as logo target pixels. On the other hand, the logo detection module 115 may determine the pixels whose cumulative gray average values are smaller than or equal to the first threshold value among the plurality of pixels as normal pixels.

The logo detection module 115 may check the number of logo target pixels, and may initialize the cumulative gray average value for each pixel stored in the accumulation buffer when the number of logo target pixels be smaller than a second value.

Next, the logo detection module 115 removes logo non-target pixels from the logo target pixels using the first partial image data input after the logo target pixels are determined (S904).

The logo detection module 115 may determine the logo non-target pixels based on the gray change value. The logo detection module 115 may acquire the gray value of the pixel corresponding to the logo target pixel from the first partial image data input after the logo target pixels are determined. The logo detection module 115 may calculate a difference between the acquired gray value and the cumulative gray average value of the logo target pixel, and determine the pixel whose calculated difference exceeds a second threshold value as a logo non-target pixel.

The logo detection module 115 may remove the logo non-target pixels determined from the logo target pixels. The logo detection module 115 may check the number of logo target pixels, and may initialize the cumulative gray average value for each pixel stored in the accumulation buffer when the number of logo target pixels be smaller than the second value. Further, the logo detection module 115 may cause the first set time of the cumulative average value calculation unit 420 to be reset and the cumulative gray average value for each pixel to be recalculated.

The logo detection module 115 determines the remaining logo target pixels, which are not removed, as logo pixels when there is no change in the number of logo target pixels for a second set time (S905).

Next, the logo detection module 115 checks whether the logo including the logo pixels is valid (S906).

The logo detection module 115 may generate size information of the logo based on the logo pixels. The size information of the logo may include at least one among the number of logo pixels, a shape of the logo, an area of the logo, a length of the logo, a height of the logo, a ratio of the logo, and a position of the logo pixel.

The logo detection module 115 may check logo validity based on the size information of the logo. The logo detection module 115 may determine whether the logo composed of the logo pixels is included in a logo validity range. The logo validity range is a range which is valid as the logo, and may include a validity range for at least one among the number of logo pixels, the shape of the logo, the area of the logo, the length of the logo, the height of the logo, the ratio of the logo, and the position of the logo pixel.

When it is determined that the logo is invalid, the logo detection module 115 may cause the logo pixel determination unit 430 to determine the logo pixels again. In one embodiment, when it is determined that the logo is invalid, the logo detection module 115 may cause the second set time to be reset and the logo non-target pixels among the logo pixels, that is, the remaining logo target pixels, to be removed.

Next, when the number of logo target pixels is smaller than a second value (min), the logo detection module 115 recalculates the cumulative gray average value for each pixel (S907).

The logo detection module 115 may check the number of logo target pixels, and may initialize the cumulative gray average value for each pixel stored in the accumulation buffer when the checked number of logo target pixels is smaller than the second value. Further, the logo detection module 115 may cause the first set time to be reset and the cumulative gray average value for each pixel to be recalculated.

Next, when it is determined that the logo is valid, the logo detection module 115 generates a logo template including a logo map which indicates the logo pixels (S908).

The logo detection module 115 may generate the logo map so that a pixel corresponding to the logo pixel may have '1' and a pixel corresponding to the normal pixel NLP may have '0'. The logo detection module 115 may map the gray value to the logo map to store the result as the logo template. In this case, the gray value mapped to the logo map may correspond to the cumulative gray average value of the corresponding pixel. The cumulative gray average value may be acquired from the accumulation buffer.

Referring to FIG. 8 again, the logo detection module 115 matches the second partial image data and the logo map (S804).

The logo detection module 115 may extract the pixels corresponding to the logo pixels included in the logo map from the plurality of pixels included in the second partial image data as logo target pixels. The logo detection module 115 may compare the gray value of each of the logo target pixels and the gray value of the corresponding logo pixel to calculate a matching rate.

The logo detection module 115 may calculate the matching rate based on a first difference value between the gray value of the logo target pixel of the second partial image data and the gray value of the logo pixel of the corresponding logo map. In this case, the gray value of the logo pixel may correspond to the cumulative gray average value of the logo pixel.

The logo detection module 115 may respectively calculate the first difference value for each of the plurality of logo pixels, and normalize the sum of the first difference values to the number of logo pixels to calculate the matching rate.

The logo detection module 115 may add a compensation value according to the background to the gray value of the logo target pixel to calculate the matching rate. The logo detection module 115 may determine a second difference value between the gray average value of the second partial image data and the gray average value of the logo map as the compensation value according to the background. The logo detection module 115 may sum the gray values of the plurality of pixels included in the second partial image data, and may divide the summed value by the number of pixels to calculate the gray average values of the plurality of pixels. The logo detection module 115 may sum the gray values of the plurality of pixels included in the logo map, and may divide the summed value by the number of logo pixels to calculate the gray average values of the plurality of logo pixels.

In one embodiment, the logo detection module 115 may calculate the matching rate based on the first difference value and the second difference value between the gray average value of the second partial image data and the gray average value of the logo map.

Next, when the matching rate is greater than or equal to a fourth threshold value, the logo detection module 115 determines that the corresponding second partial image data includes the logo (S805).

Next, the logo detection module 115 determines compensation parameters necessary for logo compensation (S806). The compensation parameters may include at least one among the number of logo edge pixels, a lower limit value of the number of logo edge pixels, a logo edge pixel number ratio, a lower limit value of the logo edge pixel number ratio, an initial matching rate, an allowable change rate of the matching rate, a lower limit value of the matching rate, a waiting time, and a gain application time.

The logo detection module 115 may check edge pixels among the logo target pixels of the second partial image data to acquire the number of logo edge pixels or the logo edge pixel number ratio. When the number of logo edge pixels is small or 0, since the logo is surrounded by the background of the same color, logo compensation may be unnecessary. The logo detection module 115 may set the lower limit value of the number of logo edge pixels and the lower limit value of the logo edge pixel number ratio according to a user input.

Further, the logo detection module 115 may determine the matching rate calculated when the initial logo is detected as the initial matching rate. Further, the logo detection module 115 may set the allowable change rate of the matching rate according to a user input. The logo detection module 115 may acquire the lower limit value of the matching rate by subtracting the allowable change rate of the matching rate from the initial matching rate. When the change in the matching rate is large, it may be determined that the screen has changed or the logo has changed. In this case, the logo detection module 115 may start a new logo search.

The logo detection module 115 may set the waiting time according to a user input. The waiting time may be a time for waiting before searching for a new logo because conditions are not met. Here, the conditions may include a condition in which the number of logo edge pixels exceeds the lower limit value of the number of logo edge pixels, a condition in which the logo edge pixel number ratio exceeds the lower limit value of the logo edge pixel number ratio, and a condition in which the matching rate exceeds the lower limit value of the matching rate.

The logo detection module 115 may set the gain application time according to a user input. The logo detection module 115 according to one embodiment of the disclosure may perform logo compensation while gradually decreasing or increasing the compensation gain to prevent a sudden change in the compensation gain. The gain application time may correspond to a time at which the compensation gain reaches a final compensation gain while being decreased or increased.

Next, the logo detection module 115 performs logo compensation on the pixels included in the region where the logo is detected (S807).

The logo detection module 115 may perform logo compensation by reducing the luminance of pixels included in the region where the logo is detected. The logo detection module 115 may multiply the luminance value by the compensation gain having a value smaller than 1 to reduce the luminance of the pixel. In this case, the compensation gain may have a value from 0 to 1.

The logo detection module 115 may directly change the luminance of pixels included in the region where the logo is detected in the second image data, but the disclosure is not limited thereto. In another embodiment, the logo detection module 115 may generate a logo compensation signal for logo compensation and transmit the generated logo compensation signal to the data processing unit of the timing controller 116.

Meanwhile, the logo detection module 115 may determine whether to perform logo compensation based on the compensation parameters, and may perform logo compensation when the logo compensation is determined.

In one embodiment, the logo detection module 115 may determine whether to perform logo compensation based on the number of logo edge pixels or the logo edge pixel number ratio. The logo detection module 115 may determine that logo compensation is unnecessary when the number of logo edge pixels is smaller than the lower limit value of the number of logo edge pixels or the logo edge pixel number ratio is smaller than the lower limit value of the logo edge pixel number ratio.

In one embodiment, the logo detection module 115 may determine whether to perform logo compensation based on the change in the matching rate. When the matching rate is smaller than the lower limit value of the matching rate, the logo detection module 115 may determine that the logo has changed. In this case, the logo detection module 115 may not perform logo compensation. In one embodiment, when the matching rate is maintained under the lower limit value of the matching rate for the waiting time, the logo detection module 115 may stop the present logo compensation, and start a new logo search.

In one embodiment, the logo detection module 115 may determine a logo compensation range based on the logo type. The logo detection module 115 may determine one of normal logo compensation and logo region compensation according to the logo type. When the logo type is a letterbox-type logo, the logo detection module 115 may determine logo region compensation. In the logo region compensation, logo compensation may be performed for a letterbox region including the logo expressed as letters, numbers, or the like. The letterbox region may be specified by an X-axis coordinate range and a Y-axis coordinate range.

Meanwhile, when the logo type is not a letterbox-type logo, the logo detection module 115 may determine normal logo compensation. In the normal logo compensation, logo compensation may be performed for the pixels in which the logo is detected.

Those skilled in the art may understand that the disclosure may be embodied in other specific forms without changing the technical spirit or essential features of the disclosure.

Further, the methods described in the specification may be implemented at least partially using one or more computer programs or components. This component may be provided as a series of computer instructions through computer-readable media or machine-readable media including volatile and non-volatile memories. The instructions may be provided as software or firmware, and may be implemented entirely or partially in a hardware configuration such as ASICs, FPGAs, DSPs, or other similar elements. The instructions may be configured to be executed by one or more processors or another hardware configuration, and the processor or another hardware configuration, when executing the series of the computer instructions, may perform all or portions of the methods and procedures disclosed herein or cause the all or portions of the methods and procedures to be performed.

According to the disclosure, since a logo map is generated using a cumulative gray average value, it cannot be greatly affected by image noise, and accordingly, a logo detection rate can be improved.

Further, in the disclosure, since a comparison with a pixel value of a previous frame is not performed, but a comparison with a gray average value cumulative for a predetermined time to be calculated is performed, an average high value can be maintained even in a case of a translucent logo. Accordingly, in the disclosure, a detection rate for the translucent logo can be improved.

Further, in the disclosure, the detection rate for the translucent logo can be further improved by reflecting a compensation value according to a background when calculating a matching rate.

The above-described specification is not limited to the above-described embodiments and the accompanying drawings, and it is apparent to those skilled in the art that various substitutions, modifications, and changes are possible within the scope without departing from the technical spirit of the specification. Accordingly, the scope of the specification will be shown by the following claims, and all possible changes or modifications in forms derived from the meaning and the scope of the claims and equivalents thereof should be understood as being within the scope of the specification.

What is claimed is:

1. A logo detection module comprising:
a preprocessing unit configured to extract partial image data based on a predetermined logo detection window region from image data, and acquire gray values based on RGB pixel values of a plurality of pixels included in the extracted partial image data;
a logo template generation unit configured to calculate a cumulative gray average value for each pixel based on gray values of a plurality of pixels acquired using first partial image data extracted from first image data input for a first set time or more, determine logo pixels based on the calculated cumulative gray average value for each pixel, and generate a logo map including the logo pixels; and
a logo compensation unit configured to match a plurality of pixels included in second partial image data extracted from second image data input after the logo map is generated and the logo pixels included in the logo map to calculate a matching rate, and determine logo compensation based on the calculated matching rate.

2. The logo detection module of claim 1, wherein:
the logo detection window region includes a first logo detection window region and a second logo detection window region spaced apart from the first logo detection window region; and
the partial image data includes first region image data corresponding to the first logo detection window region and second region image data corresponding to the second logo detection window region, wherein the logo template generation unit generates a first logo map based on the first region image data, and generates a second logo map based on the second region image data.

3. The logo detection module of claim 1, wherein the logo template generation unit includes:

a logo presence prediction unit configured to predict that the first partial image data includes a logo when the number of pixels predicted to be the logo among the plurality of pixels included in the first partial image data is greater than or equal to a first value; and a cumulative average value calculation unit configured to calculate the cumulative gray average value for each pixel based on the gray value of each of the plurality of pixels included in the first partial image data for the first set time when it is predicted that the first partial image data includes the logo.

4. The logo detection module of claim 3, wherein, when the number of pixels whose gray values are greater than or equal to a reference value among the plurality of pixels included in the first partial image data is greater than or equal to the first value, the logo presence prediction unit predicts that the first partial image data includes the logo.

5. The logo detection module of claim 1, wherein the logo template generation unit includes a cumulative average value calculation unit configured to calculate a new cumulative gray average value for each pixel based on the gray value of each of the plurality of pixels included in the first partial image data extracted from the first image data of a corresponding frame for each input of the first image data of one frame.

6. The logo detection module of claim 5, wherein the cumulative average value calculation unit includes an accumulation buffer configured to store the calculated cumulative gray average value for each pixel based on the first partial image data from a first frame to an N−1th frame, calculates a new cumulative gray average value for each pixel based on the gray value of each of the plurality of pixels included in the first partial image data extracted from image data of the Nth frame and the cumulative gray average value for each pixel stored in the accumulation buffer when the image data of the Nth frame is input, and updates the accumulation buffer with the new cumulative gray average value for each pixel.

7. The logo detection module of claim 1, wherein the logo template generation unit includes:

a cumulative average value calculation unit configured to calculate the cumulative gray average value for each pixel based on the gray value of each of the plurality of pixels included in the first partial image data extracted from the first image data input for the first set time;

a logo target pixel determination unit configured to determine two or more pixels whose cumulative gray average value for each pixel calculated by the cumulative average value calculation unit exceeds a first threshold value among the plurality of pixels included in the first partial image data as logo target pixels; and a logo non-target pixel removing unit configured to determine a pixel whose gray change value exceeds a second threshold value among the logo target pixels as a logo non-target pixel, and remove the logo non-target pixel from the logo target pixels.

8. The logo detection module of claim 7, wherein the logo non-target pixel removing unit acquires a gray value of a pixel corresponding to the logo target pixel among the plurality of pixels included in the first partial image data extracted from the first image data input after the logo target pixels are determined, and determines a pixel in which a difference between the acquired gray value and the cumulative gray average value of the logo target pixel exceeds the second threshold value as the logo non-target pixel.

9. The logo detection module of claim 7, wherein, when the number of the logo target pixels is smaller than a second value, the logo non-target pixel removing unit initializes the cumulative gray average value for each pixel, and causes the cumulative average value calculation unit to recalculate the cumulative gray average value for each pixel.

10. The logo detection module of claim 7, wherein, when there is no change in the number of logo target pixels for a second set time, the logo non-target pixel removing unit determines the logo target pixels as the logo pixels.

11. The logo detection module of claim 1, wherein the logo compensation unit includes a template matching unit configured to extract a logo target pixel corresponding to the logo pixel included in the logo map from the plurality of pixels included in the second partial image data, calculate a matching rate based on a first difference value between a gray value of the extracted logo target pixel and a cumulative gray average value of the logo pixel included in the logo map, and determine that the second partial image data includes a logo when the matching rate is greater than or equal to a third threshold value.

12. The logo detection module of claim 11, wherein the template matching unit calculates the matching rate based on a value in which a second difference value between a gray average value of the second partial image data and a gray average value of the logo map is added to the first difference value.

13. The logo detection module of claim 1, wherein, the logo compensation unit includes a compensation unit configured to determine that the second partial image data includes a logo when the matching rate is greater than or equal to a third threshold value, and determine a logo compensation range according to a type of the logo.

14. The logo detection module of claim 13, wherein, when the type of the logo is a letterbox-type logo, the compensation unit determines an entire letterbox region including the logo as the logo compensation range.

15. A timing controller comprising:

a logo detection module configured to calculate a cumulative gray average value for each of a plurality of pixels included in a logo detection window region based on first image data input for a first set time, generate a logo map based on the calculated cumulative gray average value, and compare second image data input after the logo map is generated and the logo map to determine whether to detect a logo; and a data processing unit configured to change luminance of pixels included in a region where a logo is detected in the second image data when logo detection is determined by the logo detection module.

16. The timing controller of claim 15, wherein the logo detection module determines pixels whose calculated cumulative gray average values exceed a first threshold value among a plurality of pixels included in the logo detection window region as logo target pixels, and generates the logo map based on the logo target pixels.

17. The timing controller of claim 16, wherein the logo detection module removes a pixel whose gray change value exceeds a second threshold value from the logo target pixels.

18. The timing controller of claim 15, wherein the logo detection module compares the second image data and the logo map to calculate a matching rate, and determines whether to detect the logo based on the calculated matching rate.

19. The timing controller of claim 18, wherein the logo detection module calculates the matching rate based on a first difference value between a cumulative gray average value of a logo pixel included in the logo map and a gray value of the pixel corresponding to the logo pixel in the second image data.

20. The timing controller of claim 19, wherein the logo detection module calculates the matching rate based on the first difference value and a second difference value between a gray average value of the second image data and a gray average value of the logo map.

21. A driving method of a logo detection module, comprising:

calculating a cumulative gray average value for each of a plurality of pixels based on first image data input for a first set time;

determining pixels whose calculated cumulative gray average values exceed a first threshold value among the plurality of pixels as logo target pixels;

removing a pixel whose gray change value exceeds a second threshold value from the logo target pixels when the number of logo target pixels is greater than or equal to a predetermined value; and determining the logo target pixels as logo pixels, and generating a logo map that indicates the determined logo pixels when there is no change in the number of logo target pixels for a second set time.

22. The driving method of claim 21, wherein, in the calculating of the cumulative gray average value, the cumulative gray average value for each of the plurality of pixels is newly calculated for each input of the first image data of one frame.

23. The driving method of claim 21, further comprising initializing the cumulative gray average value for each pixel when the number of logo target pixels is smaller than the predetermined value.

24. The driving method of claim 21, further comprising:

matching a gray value of each of a plurality of pixels acquired from second image data input after the logo map is generated and a cumulative gray average value of each of the logo pixels included in the logo map to calculate a matching rate; and determining that the second image data includes a logo, and generating a logo compensation signal when the matching rate is greater than or equal to a third threshold value.

25. The driving method of claim 24, wherein, in the calculating of the matching rate, the matching rate is calculated based on a first difference value between the cumulative gray average value of the logo pixel included in the logo map and a gray value of the pixel corresponding to the logo pixel in the second image data and a second difference value between a gray average value of the second image data and a gray average value of the logo map.

* * * * *